Jan. 14, 1958     J. R. SYNDER ET AL     2,819,920
ANNULAR METAL SEAL
Filed March 8, 1955
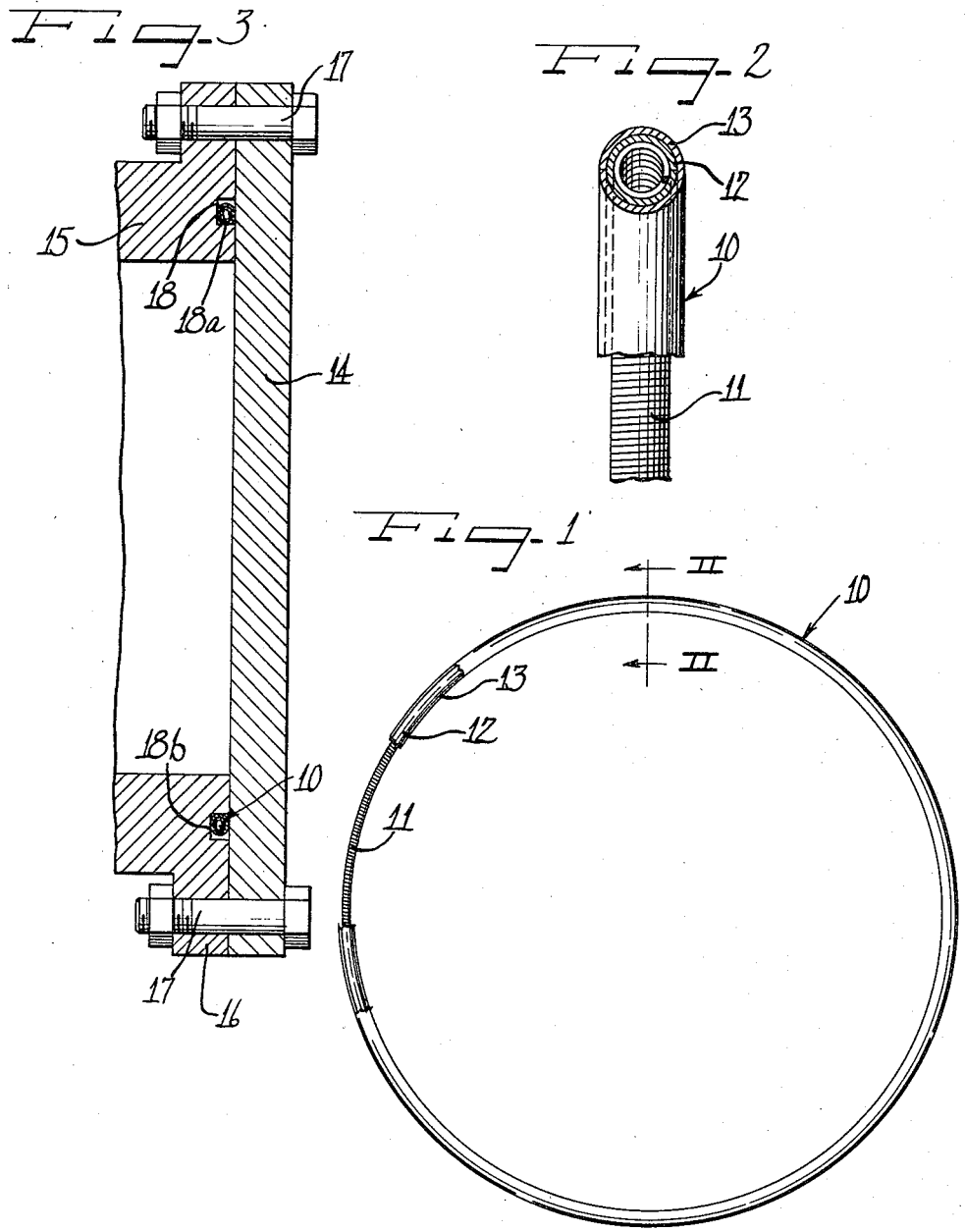
Inventors
Jacob R. Snyder
John E. Taylor

United States Patent Office 2,819,920
Patented Jan. 14, 1958

2,819,920
ANNULAR METAL SEAL

Jacob R. Snyder and John E. Taylor, Cleveland, Ohio, assignors to Thompson Products, Inc., Cleveland, Ohio, a corporation of Ohio Application March 8, 1955, Serial No. 492,912

2 Claims. (Cl. 288—30)

This invention relates to a seal or gasket for use between opposed flanges or companion machine surfaces to prevent the leakage of fluid or other material and more particularly to an all metal seal or gasket good for repeat servicing applications such as separating flanges time after time and with assurance of zero leakage.

In general, the invention comprises a helical spring in the form of a ring or annulus, and one or more clads of thin metal surrounding and enclosing the spring.

Heretofore, numerous and various types of seals and gaskets have been developed of metal and other materials, but in these instances, the gaskets or seals have not been capable of being satisfactorily reused because of the probability of leakage.

Accordingly, it is an important object of the present invention to provide an all metal seal or gasket which is capable of being reused many times with the assurance of zero leakage.

Another object of this invention is to provide a seal constructed of metal which is resilient but possessed of excellent restorative quality so that it may be used many times effectively for perfect sealing.

Still another object of this invention resides in the provision of an all metal seal possessed of yieldable qualities whereby it may return to its original shape after use, and be effectively used again and again for perfect feeling.

A further object of this invention is in the provision of an all stainless steel seal or gasket possessed with such a resilient quality as to return to its normal and original shape after being used to be ready for repeat service with assurance of perfect sealing, and which counteracts any corrosive action of any type of fluid.

Still another object of this invention resides in the provision of a stainless steel gasket or seal comprising a helical spring in the form of a ring or annulus enclosed by one or more clads of thin stainless steel, whereby such a seal is possessed with sufficient resilient characteristics enabling same to be used several times with the assurance of providing substantially perfect sealing.

Other objects, features and advantages of the invention will be apparent from the following detailed disclosures, taken in conjunction with the accompanying sheet of drawing, wherein like reference numerals refer to like parts, in which:

Figure 1 is a plan view of an all metal seal or gasket according to the invention, with parts broken away for purposes of clarity;

Figure 2 is an enlarged fragmentary sectional view with some parts broken away, taken substantially along line II—II of Figure 1, in the direction of the arrows; and Figure 3 is an elevational view in section, partially fragmentary, of a flanged conduit with a cover bolted thereon, illustrating one use of a seal or gasket according to the invention.

Referring generally to Figures 1 and 2, a seal or gasket in accordance with the invention, generally designated by the numeral 10, comprises a helical belt spring 11 shaped to form a ring or annulus and functioning as the core of the seal or gasket 10, an inner thin clad or layer 12 encircling the spring 11 and in contact therewith, and an outer thin clad or layer 13 encircling the inner clad or spring.

The spring 11 and the clads 12 and 13 may be of any suitable type of metal, but preferably of stainless steel. The thin clads 12 and 13 may initially take the form of centrally apertured flat disks, and be wrapped over the spring belt 11 with the ends abutting that may be welded or otherwise secured together providing a tight seam or joint at diametrically opposite sides of the belt spring 11 as shown in Figure 2.

As illustrated in Figures 1 and 2, the belt spring 11 is of such a diameter that the spring coils adjacent each other provide a rigid resistance to side thrust and/or pressure when in a flanged group at a time two flanges are brought into position as with bolt and nut loading. In some cases where it might be desired to provide a more yieldable core, the belt spring 11 diameter may be such that the spring is prestretched a predetermined amount when assembled which will permit the individual coils of the spring to assume any desired angle and thereby approach either a substantially solid core or one that will more easily yield to pressure when forming a seal between two surfaces.

While a pair of clads 12 and 13 are illustrated as enclosing the spring belt 11, in some cases, a single clad or any number greater than two may be used for housing the belt spring. A smooth, tight sealing surface is formed offering any amount of resistance to compression and consequent springback as may be desired, depending also upon the wire gauge, the proximity of the coils and thickness of the clad strips and their number.

The firm belt spring core plus the double clad stainless steel outer covering illustrated in the instant case, form a perfectly smooth surface free from indentations, wrinkles, etc., especially adaptable to companion machined surfaces.

One illustrated use of the instant invention is disclosed in Figure 3, wherein a disk cover 14 is secured to the outer end of a conduit 15 radially flanged at 16, by means of a plurality of circumferentially arranged nut and bolt assemblies 17. The flange 16 of the conduit 15 is annularly grooved at 18 to receive the metal seal or gasket 10 constructed in accordance with the invention. In this case, the seal or gasket is diametrically sized to hug the inner side wall 18a of the groove or recess 18, and be of a cross-sectional diameter as to engage the bottom of the groove 18b and be greater than the depth of the groove. Thus, it is seen that when the cover 14 is rigidly secured over the flange 16, the seal 10 will be partially deformed to approximate an egg shape, as illustrated in Figure 3, so that intimate sealing contact is had with the cover 14 and the side wall 18a and bottom 18b of the groove 18.

When the seal 10a is removed from this conduit end cover assembly, it will return to its normal and original shape readying the gasket for a repeat servicing application. So it is seen that the seal or gasket 10 contains a springback or restorative characteristic that not only enhances the sealing function, but allows the gasket or seal to be used again and again with the same assurance of zero leakage. Moreover, since the sealing contact of the gasket 10 is sharp and clean at all times, there are no broken or frayed portions encountered to hinder the assurance of perfect sealing. Also, because the sealing contact of the gasket or seal is sharp and clean, the gasket is substantially free of sticking and/or corrosive action regardless of the types of fluid handled whether it be radio-active water, liquid oxygen, oil, or acids, at high or low temperatures and pressures.

From the foregoing description, it will be readily seen that the all metal seal or gasket constituting the present invention is truly an all purpose seal that does not need to be renewed everytime it is removed from its particular servicing application, may be used many times with the assurance of zero leakage, and is long lived and durable.

It will be understood that modifications and variations may be effected without departing from the scope of the novel concepts of the present invention.

We claim as our invention:

1. An annular seal for use with companion machined surfaces comprising a plurality of concentric tubular metal annuli each having relatively resilient thin walls, an endless coil spring annulus core filling the innermost tubular annulus, said coil spring core having uniformly spaced coils providing uniform resistance to deformation around the entire seal, each of said tubular annuli being composed of complete rings wrapped into tubular cross-section form with the ends thereof abutting and secured together to form a tight seam thereby providing impervious continuous tubes, and the abutting ends and seams of the respective tubes lying on diametrically opposite sides of said core whereby said seal has uniform restorative powers.

2. An annular seal which comprises a tubular metal annulus having relatively resilient thin wall construction, an endless coil spring core filling said annulus, the coils of said spring being uniformly spaced to provide uniform resistance to deformation around the entire seal, said tubular metal annulus being composed of a complete ring wrapped around the core into tubular cross-section with the ends thereof welded together to form an impervious tube, a second tubular metal annulus having relatively resilient thin wall construction and being composed of a complete ring wrapped into tubular cross-section around the first mentioned tubular metal annulus with the ends thereof welded together to provide a second impervious tube, the welded together ends of the respective impervious tubes and the welds thereof being diametrically opposed whereby a resilient seal is provided which has uniform restorative powers when removed from an installation to enable subsequent use of the seal.

References Cited in the file of this patent

UNITED STATES PATENTS

| | | |
|---|---|---|
| 249,560 | Van Wagenen | Nov. 15, 1881 |
| 911,822 | Knox | Feb. 9, 1909 |
| 1,917,175 | Wills et al. | July 4, 1933 |
| 2,484,693 | De Witt et al. | Oct. 11, 1949 |
| 2,487,659 | Lockheed | Nov. 8, 1949 |